United States Patent [19]
Williams

[11] 3,940,545
[45] Feb. 24, 1976

[54] PROCESS FOR BINDING SILICEOUS FIBERS

[76] Inventor: A. Carey Williams, P.O. Box 16347 Bel Air Station, Mobile, Ala. 36616

[22] Filed: May 23, 1974

[21] Appl. No.: 472,830

Related U.S. Application Data

[62] Division of Ser. No. 276,314, July 31, 1972, Pat. No. 3,827,900.

[52] U.S. Cl. .............. 428/392; 427/214; 427/215; 427/384; 427/387; 427/407; 427/421; 428/921
[51] Int. Cl.$^2$.......................... B32B 9/00; D02G 3/00
[58] Field of Search..... 117/123 C, 123 D, 126 GQ, 117/126 GS; 106/287 S, 287 SB, 287 SE; 260/DIG. 15, DIG. 16, DIG. 19; 427/385, 384, 387, 407, 214, 215, 421; 428/392, 921

[56] References Cited
UNITED STATES PATENTS

| | | | |
|---|---|---|---|
| 2,393,863 | 1/1946 | Myers | 260/DIG. 15 |
| 2,556,045 | 6/1951 | Seidynsky et al. | 260/DIG. 15 |
| 2,990,307 | 6/1961 | Stalego | 117/126 |
| 3,287,096 | 11/1966 | Marzocchi et al. | 117/124 |
| 3,405,001 | 10/1968 | Iler | 117/126 |
| 3,567,570 | 3/1971 | Preston et al. | 117/126 |
| 3,702,783 | 11/1972 | Hartlein | 117/123 |

*Primary Examiner*—Harry J. Gwinnell
*Assistant Examiner*—Sadie L. Childs
*Attorney, Agent, or Firm*—Cushman, Darby & Cushman

[57] ABSTRACT

A process for reducing the static charge and binding glass fibers is disclosed, wherein the glass fibers are contacted with a composition comprising an alkylene polyol, such as an alkylene glycol, a lower alkanol, a polybasic acid, and a siliconate compound. The composition is applied to siliceous fibers, especially glass fibers, in either loose or blanket form, to reduce the static charge thereon and to function as a binder for the fibers. Glass fibers treated by the composition of the present invention are useful in various applications such as for blown insulation.

9 Claims, No Drawings

PROCESS FOR BINDING SILICEOUS FIBERS

This is a division of application Ser. No. 276,314 filed July 31, 1972, now U.S. Pat. No. 3,827,900.

BACKGROUND OF THE INVENTION

The prior art has used many different compositions as binders for glass fibers, with most such binders being polyester resins, producing fiberglass compositions. Typical polyester resins include linear polymers of a dibasic acid and a diol.

The Wismer et al. U.S. Pat. No. 2,999,834 discloses a process wherein a catalyst-containing coating is applied to glass fibers, which glass fibers can then be used as a reinforcing material in an interpolymerizable material matrix. The catalyst-containing coating comprises a catalyst for the matrix material contained in a coating vehicle, with the coating vehicle being typically a diester or a dicarboxylic acid and a monohydric alcohol, such as, e.g. terephthalic acid and ethanol, or a linear polyester of such acid and a glycol, such as ethylene glycol. The glass fiber coating of Wismer functions merely as a catalyst-carrying material, and to some extent, as a coupling material, and is not used as a binder per se.

The Varlet U.S. Pat. No. 3,271,182 discloses a process for producing mechanically shapable reinforced polyester resin sheets, with the reinforcing agent being, e.g. glass fibers. The glass fibers are first impregnated with a polyvalent metal salt in a diluent which is a polyhydric alcohol or a vinyl monomer, then the glass fibers are impregnated with a mixture of an interpolymerizable thermosetting polyester and a catalyst therefor. The polyesters may be made of maleic acid, or the like, and ethylene glycol, or the like.

Marzocchi et al., U.S. Pat. No. 3,287,096 discloses the use of amylopectin as a lubricant for glass fibers, used in connection with a plasticizer which may be a polyalkalene glycol, a fatty ester of glycols, or an ester of citric acid.

SUMMARY OF THE INVENTION

The present invention is directed to a composition and process for functioning as an antistatic agent and a binder for siliceous fibers, especially glass fibers, and most preferably for blown glass fibers which are used for thermal insulation. The composition which is applied to the glass fibers, preferably applied at the point wherein glass fibers are entrained in an air stream, comprises a four-component system including:
  a. An alkylene polyol, preferably a lower alkylene glycol, such as ethylene glycol, propylene glycerol, and the like, or a poly (lower alkylene glycol)
  b. A lower alkanol, preferably a lower alkanol containing 1–4 carbon atoms, such as methanol, propanol, butanol, and most preferably ethanol.
  c. A polybasic water soluble acid, preferably a polybasic water soluble acid having 2 or 3 acidic groups per molecule and a molecular weight of less than 250, such as malaic acid, tartaric acid, succinic acid and the like, especially citric acid.
  d. A water-soluble siliconate which reduces the surface tension of water, especially those siliconates which reduce the surface tension of pure distilled water by at least 50 percent, when used in an amount of 0.04 weight percent therein, such as, for instance, methyl sodium siliconate (sold commercially under the trade name Dow Corning 772.)

DESCRIPTION OF THE INVENTION

The present invention is directed to an antistat and binder for siliceous fibers, especially glass fibers. When applied to siliceous fibers, the composition of the present invention reduces or dissipates the static electical charge thereof, and serves as a binder for the fibers.

The composition comprises four essential ingredients, as follows:
  a. An alkylene polyol, preferably an lower alkylene glycol or poly (lower alkylene glycol), such as ethylene glycol, propylene glycol, glycerol, polyethylene glycol of molecular weight up to 600, and the like.
  b. A lower alkanol, preferably a lower alkanol containing 1–4 carbon atoms, such as methanol, propanol, butanol, and most preferably ethanol.
  c. A polybasic water soluble acid, preferably a polybasic water soluble acid having 2 or 3 acidic groups per molecule and a molecular weight of less than 250, such as maleic acid, tartaric acid, adipic acid, succincic acid and the like, especially citric acid.
  d. A water-soluble siliconate which reduces the surface tension of water, especially those siliconates which reduce the surface tension of pure distilled water by at least 50 percent, when used in an amount of 0.04 weight percent therein, such as, for instance, methyl sodium siliconate.

In addition to the above components, it will be readily appreciated by those in the art that additional ingredients may be included in the composition of the present invention, without departing from the spirit thereof. For instance, a coupling agent may be added to the composition, or may be present upon the silicious fiber surface when the fibers are contacted by the composition of the present invention, to improve the adhesion of the composition of the present invention to such fibers. When applied to glass fibers used in the blown insulation field, the coupling agents may assist in producing improved fire retardant or fireproofing results, and may allow improved control of the resultant insulation density.

The preferred coupling agent is a silane coupling agent sold under the trade name Dow Corning Z-6031 Silane which is a catonic, methacrylate functional silane coupling agent having the typical physical properties:

| | |
|---|---|
| Percent Solids | 50% |
| Color | Amber Brown |
| Refractive Index a 25°C | 1.457 |
| Specific Gravity a 25°C | 1.06 |
| Viscosity a 25°C | 70 cs. |
| Flash Point, open cup | 130°F |
| Solvents | Mostly diacetone alcohol |
| Suitable diluents | Alcohols, Water |

Typical other known coupling agents include the vinyl silane coupling agents, such as, for instance, vinyltriethoxy silane, vinyl trichloro silane, vinyl triethoxy silane, vinyl triacetoxy silane and the like, as well as γ-aminopropyl triethoxy silane, and γ-methacryloxypropyl trimethoxy silane. Other conventional additives for glass fiber reinforced resins may be added, if desired, such as ultraviolet stabilizers, interpolymerization catalysts, and the like. It will be appreciated, of course, that the siliceous fibers, including glass fibers, may contain conventional sizes thereon.

A significant advantage of the present invention resides in the fact that atmospheric pollution by skin and membrane irritants and suspended glass fibers and glass fiber dust is greatly reduced, or even eliminated. For instance, in the insulation of buildings with blown glass fibers, prior art systems involve a substantial respiratory problem with floating glass fibers and glass fiber dust. Also, most of the prior art antistat and binder compositions involved the use of components which were irritating to lung tissues, skin, eye and nose membranes, and the like. Thus, the compositions of the present invention and particularly the preferred embodiment involving ethylene glycol, citric acid, and ethanol, in addition to the siliconate, greatly reduce environmental pollution when used as a binder and antistat agent for glass fibers in the blown insulation field.

In the installation of blown insulation, it is conventional to pass fibrous glass rovings through a so-called chopping device and then entrain the chopped fibrous glass in an air stream which delivers the chopped fribrous glass to the desired points of application. Various additives may be added to the air stream, either before or after the entrainment of the chopped fibrous glass. In an especially preferred embodiment of the present invention, the anntistat and binder composition of the present invention is added to the air stream, either just prior to the point where the air stream entrains the chopped fibrous glass, or just after such entrainment. It will be appreciated, however, that the antistat and binder composition can be added to the entrained chopped fibrous glass stream after discharge from the entrainment apparatus, but this is not preferred. It may be desirable in some instances to add one or more components of the present invention at a point in the entraining air stream different than the points wherein other additives are added. It is preferred that the composition contain at least one silane coupling agent, as described hereinabove, as the coating components appear to interract at a faster rate in the presence of such a silane coupling agent.

The alkylene polyol is a substantially water-soluble polyol, preferably a lower alkylene polyol of 2–4 carbon atoms, most preferably containing 2–3 hydroxyl groups, although it will be appreciated that more carbon atoms and/or a greater number of hydroxyl groups may be present in the alkylene polyol. Preferred lower alkylene polyols include propylene glycol, glycerol, and, most preferably, ethylene glycol. Poly lower alkylene glycols, such as polyethylene glycol and polypropylene glycol, can also be used. Mixtures of alkylene polyols may be used.

The lower alkanol is most preferably ethanol, as the properties of the resulting composition are most satisfactory when ethanol is used, and the use of ethanol eliminates health hazards associated with most other lower alkanols. It will be appreciated, however, that alkanols of 1–4 carbon atoms, such as methanol, propanol, isopropanol, and the like, may be used to replace all or part of the ethanol, but precautions should be taken to insure that the fumes of these lower alkanols are not inhaled by workers. If a denaturant is present in the ethanol, it should be checked to insure that it does not interfere with the reaction of the ethanol with the other components of the composition of the present invention. Mixtures of lower alkanols may be used.

The polybasic acid is preferably citric acid, as most favorable results have been obtained with the use of citric acid. However, other polybasic acids may be used to replace all or part of the citric acid, including polybasic water soluble acids, preferably polybasic water soluble acids having 2 or 3 acidic groups per molecule and a molecular weight of less than 250, such as maleic acid, tartaric acid, succincic acid, and the like. It is essential that the polybasic acid, like the other components of the present composition, be substantially water soluble (i.e. soluble at least to the extent of 3 percent by weight in pure distilled water at room temperature.) Mixtures of polybasic acids may be used.

The fourth component of the present invention is at least one water soluble siliconate which reduces the surface tension of water. As mentioned hereinabove, the siliconate should reduce the surface tension of pure distilled water by at least 50 percent, when present in an amount of 0.4 percent by weight. The preferred siliconate is methyl sodium siliconate, sold under the trade name Dow Corning 772.

The order of addition of the components of the coating composition of the present invention is extremely important, and, in fact, critical. The alkylene polyol and the lower alkanol are first mixed together and then the polybasic acid is added to such mixture. While the sodium siliconate can be added prior to the addition of the polybasic acid, this approach is definitely not preferred for lower temperature application, e.g., 60° F, as greatly improved results are obtained if the water soluble siliconate is added after the polybasic acid has been added to the mixture of alkylene polyol and lower alkanol. However, for higher temperature applications, e.g., 80°F applications, it is preferred to add the siliconate prior to the acid. While the silane coupling agent may be added at any point in the production of the antistat and binder composition, as long as adequate care is taken to insure that the coupling agent is not precipitated, it is greatly preferred to add the silane coupling agent after the addition of the siliconate.

The composition of the present invention is applied in an aqueous system, and the water may be added to the composition at various points in the formation of same. However, it has been found greatly preferred to add the siliconate to the composition in the presence of at least 400 weight percent of water, based on the weight of the siliconate. Likewise, it has been found greatly preferred to add the silane coupling agent in an aqueous system, wherein the weight ratio of water:silane is at least 20:1, preferably about 100:1, or greater.

The amount of water in the aqueous system may vary widely. it is generally best to use at least 30 percent by volume of the system of water, as lower amounts of water result in a system which is difficult to use in spray applications. If amounts of water in excess of 70 percent or so by volume of the mixture are used, problems may be encountered in that insufficient amounts of the active coating components may be applied, or else too much water must be removed in order to readily produce a dried coating composition upon the sileceous fibers. For these reasons, the amount of water used is generally from 30–70 percent by volume of the mixture, most preferably about 50 percent by volume of the mixture.

In the preferred embodiment of producing the compositions of the present invention, the alkylene glycol and the lower alkanol are mixed together, the dibasic acid is added, and then an amount of water is added, corresponding to at least 30 percent by volume of the mixture, preferably about 50 percent by volume of the mixture. Thereafter, the siliconate and the silane are added to this aqueous mixture, with the aqueous dilution of these ingredients set forth hereinabove.

The mixing of the ingredients described hereinabove is preferably conducted at substantially room temperature, although higher and lower temperatures may be used if desired, e.g., from 35° to about 100°F, preferably between 45° and 75°F. The four-component composition, optionally containing the silane coupling agent, is generally stable for at least 12 hours. If the composition is to be stored for a greater time, the final step of mixing the siliconate (and the silane, if used) may be omitted, and the aqueous system of alkylene polyol, lower alkanol, and polybasic acid is generally storage stable for several days under ambient conditions if stored in an inert container.

It has generally been found that ferrous metal containers and polyvinyl chloride containers are to be avoided, and polyethylene, aluminum, copper and bronze containers are satisfactory, with polyethylene preferred for extended storage times.

The composition of the present invention will be applied to silicious fibers in widely varying amounts. For instance, in the case of glass fibers, it is preferred to apply about 4 oz. of the composition of the present invention to 30 lbs. of fiber, at an application temperature of 70°–80°F. Because of component volatilization, lower amounts of the composition may be used at lower temperatures, and vice versa. The use of the composition of the present invention within the aforesaid range results in a coating of substantial continuity on the silicious fibers, in the case of glass fibers of a type and diameter typical of the blown insulation field. Of course, lower amounts of the composition of the present invention may be used to produce a discontinuous coating upon the fibers. Broadly speaking, the composition will be applied to the fibers in an amount of about 1–10 oz., or even higher, of the coating composition per 30 lbs. of silicious fiber.

The ratio of the ingredients in the four-component composition of the present invention may vary, according to the application temperature, humidity, and fiber composition and free fiber content. In the typical Southern application involving temperatures of 80° F., the composition will contain about 16 oz. per gallon of ethylene glycol, 10 oz. per gallon of ethanol, 9 oz. per gallon of citric acid, 4.5 oz. per gallon of methyl sodium siliconate, and about 0.1 percent by weight of silane coupling agent. The aforesaid amounts may be varied if ingredients other than those specified above are used, although it is generally preferred to use substantially molar equivalent amounts, based on the amounts of the preferred ingredients. If lower application temperatures are utilized, the amount of alkylene glycol will generally be raised, and the amount for lower alkanol and polybasic acid will be lowered. For instance, for application at 60°F., about 18 oz. per gallon of ethylene glycol, about 8 oz. per gallon of citric acid and about 8 oz. per gallon of ethanol, or equivalents thereof, will be used. Generally, the amounts of siliconate and silane, if the latter is used, are relatively independent of the application temperature.

Broadly speaking, however, the ingredients of the coating composition of the present invention will be used in the molar ratios set forth below:

| | |
|---|---|
| lower alkanol | 1 mole |
| polybasic acid | 0.15 – 1.0 mole |
| alkylene polyol | 0.7 – 3.7 moles |

In addition to the above components of the present invention, the composition will preferably contain the weight ratios set forth below, based on 1 part by weight of ethanol:

| | |
|---|---|
| citric acid | 0.8 – 4 parts by weight |
| ethylene glycol | 1 – 5 parts by weight |
| sodium methyl siliconate | 0.1 – 1 part by weight |

The above composition may optionally contain from 0.001, or less, percent by weight of silane coupling agent, up to 5 percent by weight or so of silane coupling agent, although generally no substantial advantage will be noted using levels of silane coupling agent greater than 0.5 percent by weight.

The amount of siliconate in the above formulation is quite critical, and each composition within the aforesaid range should be checked to insure that the siliconate is within the proper range, as too much siliconate results in the production of a floury powder, or a granulation product, on the surface of the composition upon exposure to air. Preferably, therefore, the siliconate will be used in an amount of less than 0.7 parts per part of lower alkanol.

The content of the citric acid or other polybasic acid is critical in that amounts of acid in excess of the stoichiometric amount, based upon the alkylene glycol and lower alkanol, taking into consideration, of course, possible volatilization of these components and especially volatilization of the lower alkanol, is liable to result in filament breakage, producing an undesirably high fuzz level. Therefore, in the above coating composition ranges, it will be understood that the polybasic acid will not be present in an amount substantially in stoichiometric excess of the alkylene glycol and lower alkanol combined.

In addition to the application of the compositions of the present invention to insulating fibers, it will be readily appreciated that the composition of the present invention may be applied to loose silicious fibers to bind such fibers into mats or boards for use in application which may or may not involve thermal insulation. In such applications, the fibers are generally contacted with the composition of the present invention on a production line, and it will generally be found advantageous to utilize a heating step to insure a rapid, full cure of the composition of the present invention. Generally, the heating step will involve a temperature of at least 100°F, more preferably at least 180°F. The heating temperature may be much greater than the aforesaid temperatures, as long as the heating temperature is less than the decomposition temperature of the components of the coating composition. Generally, however, the heating temperature will not involve a temperature above 400°F, although higher temperatures may be used, if much shorter times of exposure are involved.

EXAMPLES OF THE INVENTION

The invention will be understood more readily by reference to the following examples; however, these examples are intended to illustrate the invention and are not to be construed to limit the scope of the invention.

EXAMPLE I

The following materials were mixed at room temperature, in the order indicated, to produce 1 gallon of coating composition.

First, 16 oz. of ethylene glycol and 10 oz. of ethanol were stirred together in a flask at room temperature. 9 oz. of concentrated citric acid were stirred into the mixture, and then distilled water was added to amount to 50 volume percent of the resulting mixture. Thereafter, 4.2 wt. percent of sodium methyl siliconate in an aqueous solution having a water-siliconate weight ratio of 4:1, was added to the above mixture with stirring at room temperature. Next, 0.1 percent by weight of γ-methacryloxy-propyltrimethoxy silane in 100 parts of water was added to the mixture at room temperature with stirring.

The resulting coating composition solution had a room temperature shelf stability of at least 24 hours.

The above described composition was applied to chopped glass fiber rovings in a Universal Insulating Volumatic Machine, with injection of the coating composition into the glass fiber-entrained air stream downstream of the chopper. The coated glass fibers were directed into the attic areas of a typical residential home, with no noticeable chemical odor and a minimum amount of "dusting" of glass fibers at 80°F. Within 24 hours, the coating composition had solidified into a firm adherent binder for the glass fibers, and no noticeable water content was noted thereon (a noticeable setting of the composition was noted immediately after discharge from the machine nozzle).

From the above, it will be appreciated that this example resulted in substantially no environmental pollution, wherein prior art efforts, using other antistatic and binder compositions generally result in substantial health hazards from inhalation of the glass fibers into the respiratory system, as well as exposure of lung and skin surfaces and other body surfaces to irritants in the prior art coating composition. In addition, the prior art compositions generally involved substantial amounts of overspray, wherein the glass fibers adhered to attic walls, ceilings, and the like, so that the insulating effectiveness of a given amount of applied glass fibers was greatly reduced.

The results obtained above suggested that other polyols may be used to replace part or all of the ethylene glycol. For instance, it should be possible to replace all or part of the ethylene glycol with an equal molecular amount of one or more straight or branched chain alkane of up to 10 carbon atoms, having at least one hydroxyl group on each secondary or tertiary carbon atom. Examples of such polyols are pentaerythitol, sorbitol, sucrose, and the like. The results obtained above also suggest that polymeric polyols should be useful in the practice of the present invention, as replacement, in whole or in part, for the ethylene glycol or other alkylene polyol. Such polymeric polyols include polysaccharides, such as dextrin, and polyvinyl alcohol or the like.

The above results also suggest that certain acids not substantially soluble in pure distilled water might be suitable for use in the practice of the present invention if rendered soluble by the use of an alkaline agent to raise the pH of the coating composition. For instance, prior to the addition of such acid, the aqueous solution of the polyol and the alcohol may be mixed with sodium hydroxide or even sodium methyl siliconate, which is quite alkaline, to a pH of at least about 8.0, preferably at least 8.5. This approach should allow less water-soluble acids, such as fumaric acid, to be utilized in the practice of the present invention. In following this approach, the use of the siliconate to raise the pH appears particularly preferred.

EXAMPLE II

Example I was repeated, except the siliconate and the silane were added to the aqueous mixture of ethylene glycol and ethanol prior to the addition of the citric acid. This composition was somewhat more suitable for use in applications involving higher ambient temperatures, i.e., 80°F., as less polymeric residue was found in the composition storage tanks of the application equipment.

I claim:

1. Process for reducing the static charge and binding siliceous fibers, said process comprising first forming an aqueous composition comprising about 30 to about 70 percent by weight of water, 1 part of at least 1 lower alkanol of 1 to 4 carbon atoms, about 0.8–4 parts of at least 1 polybasic water-soluble acid having 2 or 3 acidic groups per molecule and a molecular weight of less than about 250, about 1–5 parts by weight of a lower alkylene polyol or poly(lower alkylene glycol), and about 0.1–1 parts of at least 1 water-soluble siliconate which reduces the surface tension of pure distilled water by at least 50 percent when used in an amount of 0.4 weight percent therein, wherein said lower alkanol and said lower alkylene polyol or poly(lower alkylene glycol) are mixed together prior to the addition thereto of said polybasic acid, applying the resulting composition to siliceous fibers at a temperature from about 35° to about 100°F in an amount corresponding to at least 1 oz. of said composition per 30 lbs. of siliceous fibers, and then drying said fibers to form a dried coating of said composition thereon.

2. Process as claimed in claim 1, wherein said composition additionally contains a coupling amount of at least 1 silane coupling agent.

3. Process as claimed in claim 1, wherein said alkylene glycol is ethylene glycol.

4. Process as claimed in claim 3, wherein said lower alkanol is ethanol.

5. Process as claimed in claim 4, wherein said polybasic water-soluble acid is citric acid.

6. Process as claimed in claim 5, wherein said water-soluble siliconate is methyl sodium siliconate.

7. Process as claimed in claim 1, wherein said composition is applied to chopped glass fibers.

8. Process as claimed in claim 7, wherein said chopped glass fibers are entrained in an airstream when contacted by said composition.

9. Blown glass fiber insulation when produced by the process of claim 8.

* * * * *